Dec. 3, 1940.  W. F. HELWIG  2,223,824

TIRE CHAIN

Filed March 7, 1938

Inventor
William F Helwig
By
Attorneys

Patented Dec. 3, 1940

2,223,824

UNITED STATES PATENT OFFICE 2,223,824

TIRE CHAIN

William F. Helwig, Milwaukee, Wis.

Application March 7, 1938, Serial No. 194,412

1 Claim. (Cl. 152—237)

This invention appertains to motor vehicle attachments, and more particularly to anti-skid chains of the type wherein the road-engaging elements extend transversely about the tire.

One of the primary objects of my invention is to provide a novel anti-skid chain of the above type which will be easy to place on and remove from a tire, and which will readily adapt itself to the contour of the tire and be held against creeping transversely around the tire.

Another salient object of my invention is the provision of novel tire side wall-engaging plates for carrying the chains or other anti-skid elements, having means thereon for engaging the tire rim to prevent transverse creeping of the tire chains, with means for detachably connecting the plates together.

A further object of my invention is the provision of resilient means carried by one of said plates for connection with the plate-securing means or strap, whereby the chains will be held by a spring pressure on the tire tread, the construction being such that a certain give is permitted during the placing of the chains on the tire, whereby the chains can be tightly secured in place.

With these and other objects in view, the invention consists in the novel construction, arrangement, and formation of parts, as will be hereinafter more specifically described, claimed, and illustrated in the accompanying drawing, in which drawing:

Referring to the drawing in detail, wherein similar reference characters designate corresponding parts throughout the several views, the letter D generally indicates my improved anti-skidding device for a tire T.

Figure 1:
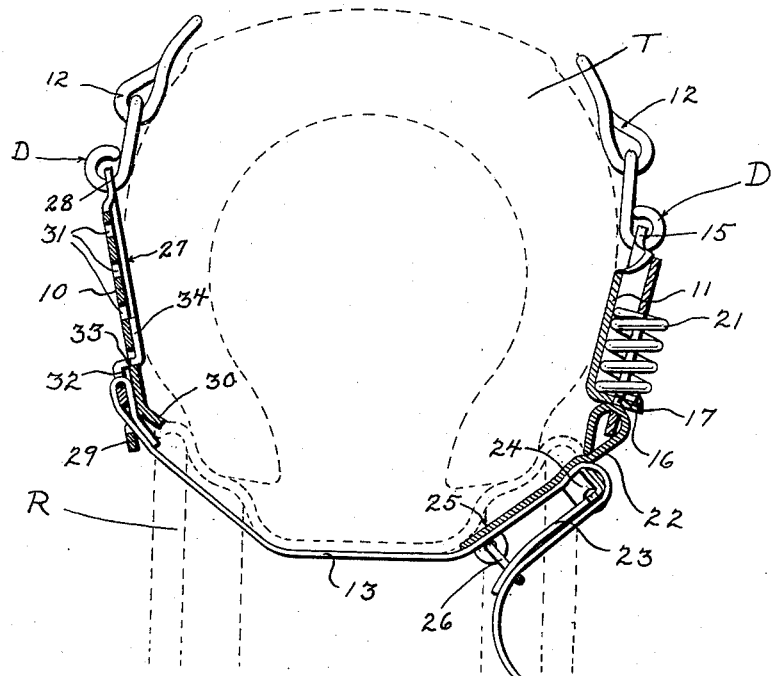
Figure 1 is a fragmentary side elevation of my improved anti-skidding device, showing parts thereof broken away and in section, the device being shown applied to a tire and a rim, the tire and rim being illustrated in dotted lines.
Figure 2:
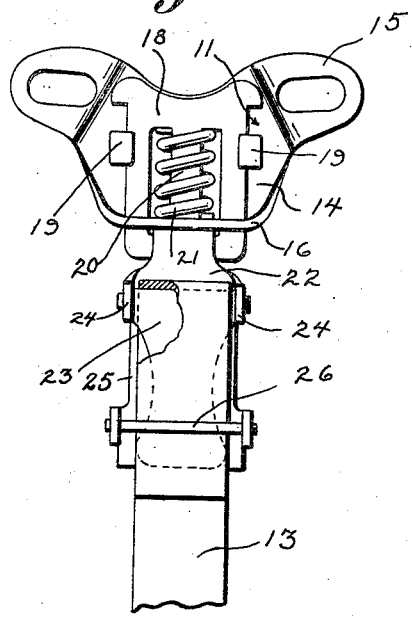
Figure 2 is a front elevation of one of the novel tire side wall-engaging plates, showing the resilient take-up carried thereby and the locking lever for engaging the connecting strap.
Figure 3:
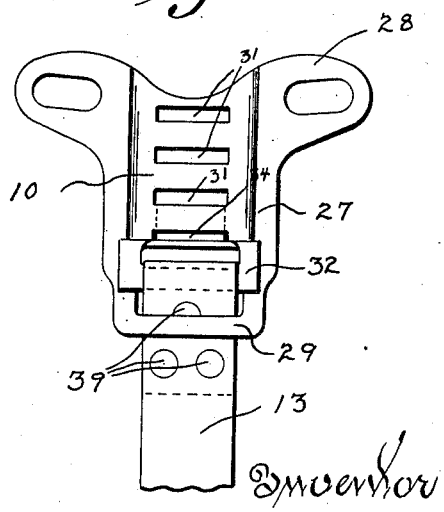
Figure 3 is a front elevation of the other tire side wall-engaging plate, illustrating the means for detachably connecting the securing strap in different positions thereon.

The tire T can be of any preferred character or make, and is mounted in the usual manner on a rim R.

The anti-skidding device D comprises tire side wall-engaging plates 10 and 11. Each of these plates is formed from metal of the desired gauge and carries the chains or other anti-skid elements 12. These plates are detachably connected together by the use of a flexible strap 13.

The side wall plate 11 includes a flat body portion 14 having formed on its upper outer corners laterally extending ears 15 for receiving the terminals of the chains 12. The lower outer edge of the body plate 14 has formed thereon an abutment flange 16, provided with a guide slot 17. Slidably mounted through the guide slot is the spring carrier plate 18, and this plate is held on the body plate 14 by suitable guide ears 19, which can be struck out from the body. The spring carrier plate 18 has formed thereon a central tongue 20, on which is disposed the expansion coil spring 21. While I have shown and described the resilient member 21 on the tongue 20 as a coil spring, it is obvious that an equivalent device for absorbing shock can be substituted for the coil spring. Thus, the resilient device can take the form of a live rubber sleeve, and this sleeve can be placed on the tongue 20 in the same manner as the coil spring, and be confined in place in the same way as the coil spring.

The lower end of the spring 21 rests upon the flange 16, while the upper end of the spring engages the plate 18 for normally urging the plate to a raised position. The lower end of the spring carrier plate has pivotally mounted thereon the securing buckle 22 for engaging and holding the free end of the flexible strap 13.

The buckle 22 can consist of a clamping lever 23 rockably mounted on ears 24 formed on the buckle body plate 25. When the strap has been drawn to an adjusted position, the lever is swung down so as to firmly clamp the strap against the buckle body plate 25, after which the strap is brought over the outer face of the lever. To hold the lever against accidental opening movement, a pivoted bail 26 is carried by the buckle body plate, and this bail is adapted to be swung over the free end of the strap and the lever 23.

The other side wall-engaging plate 10 consists of a substantially flat body portion 27 having laterally extending ears 28 formed thereon for receiving the chains 12. The extreme lower end of the body has struck out therefrom a loop 29, through which the strap 13 is adapted to be threaded. The material struck out from the loop 29 is bent back to form a lip 30, which is adapted to engage and rest on the tire rim R, for a purpose which will be later set forth.

The body 27, above the loop 29, has formed therein a series of equidistantly spaced, transversely extending slots 31. The end of the strap 13 which is remote from the buckle 22, has rigidly secured thereto an attaching loop 32. The upper edge of the loop is provided with a right-angularly extending flange 33, which in turn carries the upwardly directed finger 34.

The strap 13 is initially threaded through the loop 29 until the loop 32 carried by the strap reaches a desired point on the plate 10, at which time the finger 34 is placed through a selected opening 31, and when downward pressure is exerted on the strap, the finger 34 will be forced into contact with the rear face of the plate, and the flange 33 will rest on the bottom wall of said opening. This will effectively anchor one end of the strap to the plate 10, and, obviously, by changing the position of the loop 32 on the plate, initial adjustment of the strap can be had to permit the use of the anti-skid device on different sizes of tires.

After the strap 13 has been anchored to its plate 10, the chains 12 are placed around the tire, and the free end of the strap is brought through the buckle 22, as heretofore described. By drawing down on the free end of the strap, the spring 21 can be placed under tension, and thus the chains 12 will be held into firm engagement with the tire tread. By referring to Figure 1, it can be seen that the lip 30 of the plate 10 will engage and rest upon one side of the rim R, while a part of the buckle 22 will engage the other side of the rim. This will effectively prevent transverse creeping of the device around the tire.

From the foregoing description it can be seen that I have provided an exceptionally simple and durable anti-skid device for vehicle tires.

Changes in details may be made without departing from the spirit or the scope of my invention, but what I claim as new is:

A resilient connection for the ends of automobile tire crosschains comprising, an elongated metal plate having a central body portion, laterally extending apertured chain-receiving ears on the outer corners of the body portion, a slotted right-angularly extending flange on the inner end of the body portion and protruding outwardly therefrom, spaced guides on the body portion between the ears and the right-angularly extending flange, a carrier plate slidably mounted in the slot of the right-angularly extending flange and in the spaced guides, said carrier plate having a central tongue, and a resilient member mounted about said tongue and confined between the right-angularly extending flange and the outer end of the carrier plate for normally holding the carrier plate in and over the body portion of the elongated plate.

WILLIAM F. HELWIG.